Figure 1:
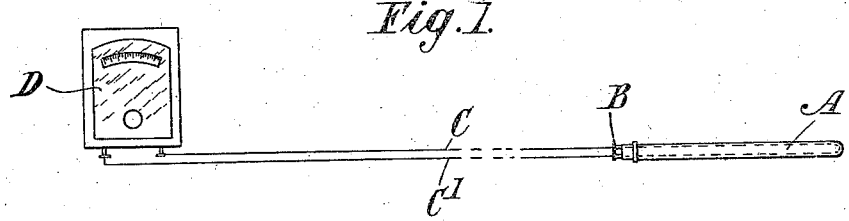

W. S. PEAKE.
THERMO-ELECTRIC PYROMETER.
APPLICATION FILED NOV. 13, 1909.

1,025,715.

Patented May 7, 1912.

UNITED STATES PATENT OFFICE.

WILFRID STEVENSON PEAKE, OF CAMBRIDGE, ENGLAND, ASSIGNOR TO TAYLOR INSTRUMENT COMPANIES, OF ROCHESTER, NEW YORK.

THERMO-ELECTRIC PYROMETER.

1,025,715.  Specification of Letters Patent.  Patented May 7, 1912.

Application filed November 13, 1909. Serial No. 527,951.

*To all whom it may concern:*

Be it known that I, WILFRID STEVENSON PEAKE, a subject of the King of England, residing in Cambridge, England, have invented certain new and useful Improvements in Thermo-Electric Pyrometers, of which the following is a specification.

This invention relates to improvements in thermo-electric pyrometers in which a thermo-couple of some rare or noble metals, such as for instance, platinum and an alloy of platinum, is connected by base metal leads to an indicating or recording instrument at some distance from the thermo-couple itself.

The object of this invention is to increase the accuracy of the readings obtained and to render unnecessary any device for maintaining the junction between the leads and the thermo-couple at a constant temperature, by causing the readings to be independent of the temperature of that end of the thermo-couple to which the leads are connected.

Hitherto it has been customary to insulate the wires forming the thermo-couple by porcelain insulators, and to protect them by a porcelain, silica, or metal tube closed at one end. At the end remote from the closed end, terminals are provided by which connection is made between the leads and the thermo-couple wires. The closed end of the tube is intended to be inserted in the furnace and will be hereinafter referred to as the "hot" end of the thermo-couple, while the end carrying the terminals must be kept cool and will be referred to herein as the "cold" end. The connection between the thermo-couple and the indicating or recording instrument is generally made by copper leads or other base metal, the metal being the same however for both leads. With this arrangement the temperature indicated by the instrument is not the difference in temperature between itself and the "hot" end of the thermo-couple, but the difference in temperature between the "cold" end and the "hot" end of the thermo-couple, and therefore the readings of the instrument vary if the temperature of the "cold" end of the thermo-couple is varied.

The object of this invention is to render the readings of the indicating or recording instrument entirely independent of changes in the temperature of the "cold" end of the thermo-couple, and thus to render unnecessary the adoption of means to maintain the "cold" end at a constant temperature as is sometimes done at present in cases where accuracy is important.

It has previously been proposed to construct a thermo electric couple in which the noble metals are employed and wherein, in order to reduce the prime cost of the couple, portions of the noble metals are replaced by conductors composed of base metals or alloys. The base metal conductors are so chosen and arranged for their relative thermo electric properties that their inclusion in the couple will not affect the thermal electromotive force of the main couple, that is to say, secondary couples will be set up at the junctions of the noble with the base metals which neutralize one another. Lead wires serve to connect the base metal conductors to the recording instrument and it is essential that the junctions of the base metal conductors with the leads should be maintained at a uniform temperature as is usual in pyrometric practice.

According to this invention two connecting leads are employed composed of two dissimilar metals or alloys which act as a compensator for the variations of temperature at the junction of the leads with the thermo-couple.

One feature of this invention consists in the employment of leads composed of dissimilar metals or alloys, these metals or alloys being such that their thermo-electromotive force when in direct contact is equal to that of the thermo-couple for the same temperature difference. This need only apply within the range of temperature met with at the "cold" end of the thermo-couple.

A further feature consists in the employment of leads each of which is composed partly of a metal or alloy dissimilar to that of a corresponding part of the other, the other portions of both leads being composed of the same metal or alloy.

The leads composed according to this invention may be called "compensator leads", since when they are correctly connected to the "cold" end of the thermo-couple their effect is to set up at the terminals subsidiary thermo-electric-forces which compensate for and eliminate the effect of changes in the temperature of the "cold" end of the thermo-couple. They may be said to transfer the effect of the "cold" end of the thermo-couple from the thermo-couple itself to the indicating or recording instrument where the variation of temperature is always comparatively small and by modification in the design of the instrument, its readings may then be made to depend solely upon temperature of the "hot" end of the thermo-couple. In choosing the metals or alloys for the compensator leads it is important to choose them of as low resistance as possible and for this reason copper is preferably employed as one lead and an alloy of copper with a small percentage of nickel for the other lead. By slightly varying the percentage of nickel it is possible to adjust the thermo-electric properties of the leads to the desired value in order to correspond with a particular platinum, platinum-rhodium, or platinum-iridium thermo-couple being used. It is of course understood that many different metals or alloys could be found to give the necessary thermo-electric properties, but practically all would be higher in resistance and therefore less satisfactory commercially than those mentioned.

Several forms of connection between the thermo-electric pyrometer and the indicating or recording instrument are illustrated diagrammatically in the accompanying drawings.

Figure 2:
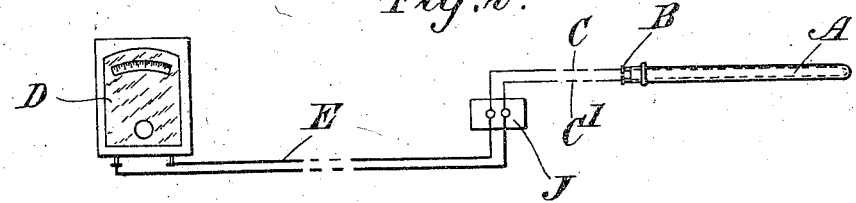
Figure 3:
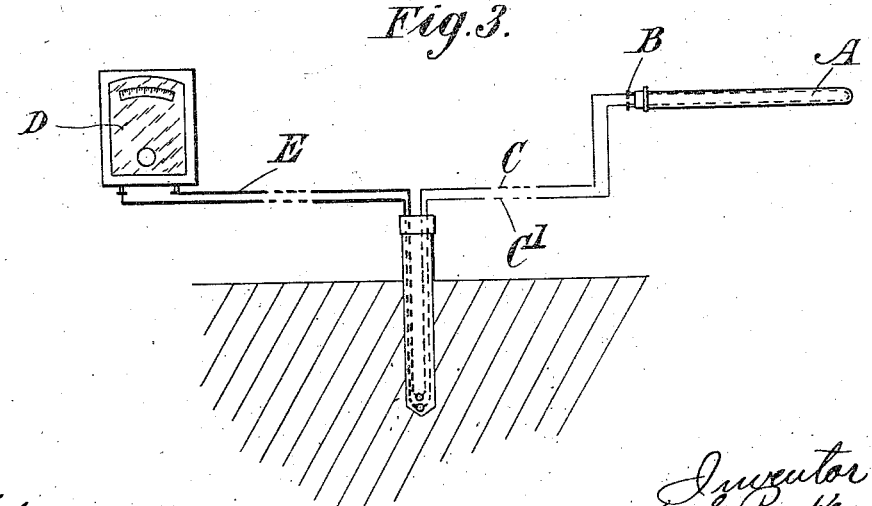

Figure 1 illustrates an arrangement in which the thermo-couple is connected directly to the recording instrument by means of leads composed of dissimilar materials. Fig. 2 illustrates a modification in which leads composed of dissimilar materials C C' are taken to a certain point J, and there connected with leads of similar material connected to the recording instrument. Fig. 3 illustrates a modification of the arrangement shown in Fig. 2 in which the connections at the junction are buried in the earth.

In Fig. 1 the thermo-couple A is composed of two portions which are in direct contact at the closed end of the pyrometer tube. One portion may be composed of platinum and the other portion of a platinum-rhodium or platinum-iridium alloy. The couple is connected to the indicating instrument D by means of compensator leads C C' connected to the thermo-couple at the terminals B. The wires C and C' are composed preferably of copper and a copper nickel alloy respectively.

Figs. 2 and 3 illustrate an arrangement in which the compensator leads C C' are connected at the terminals B to the thermo-couple but which only extend a portion of the distance to the indicating instrument. In Fig. 2 they are connected at a junction box J to two other leads E. Both the leads E are composed of any suitable base metal such as copper or a suitable alloy.

The readings obtained are still independend of variations in the temperature of the "cold" end of the thermo-couple B, but will be affected by variations of temperature at the junction where the compensator leads C are joined to the copper leads E. If this junction is outside the zone of radiated or conducted heat from the furnace in which the thermo-couple is being used it will probably be at a fairly uniform temperature, so that the readings will be sufficiently accurate for most commercial work. Fig. 3 shows this junction point of the compensator leads to the copper leads buried in a tube in the ground in order to be maintained at a more nearly uniform temperature than would be the case in the open air.

What I claim as my invention and desire to secure by Letters Patent is:—

1. In a thermo-electric pyrometer comprising a thermo-couple and a current indicating or measuring device, leads connected to the thermo-couple and forming a portion at least of the connection between the thermo-couple and the said current indicating or measuring device, said leads being composed of materials dissimilar to the materials forming the thermo-couple, one of said leads being composed of a base metal and the other of a low resistance alloy and so arranged as to act as a compensator for the variations of temperature at their junction with the thermo-couple; substantially as described.

2. In a thermo-electric pyrometer comprising a thermo-couple and a current indicating or measuring device, leads connected to the thermo-couple and forming a portion at least of the connection between the thermo-couple and said current indicating or measuring device, said leads being composed of materials dissimilar to the materials forming the thermo-couple, one of said leads being composed of copper and the other of a low resistance alloy and so arranged as to act as a compensator for the variations of temperature at their junction with the thermo-couple; substantially as described.

3. In a thermo-electric pyrometer comprising a thermo-couple and a current indicating or measuring device, leads connected to the thermo-couple and forming a portion at least of the connection between the thermo-couple and said current indicating or measuring device, said leads being composed of materials dissimilar to the materials forming the thermo-couple, one of said leads being composed of copper and the other of an alloy consisting of copper from 99.9% to 95% and nickel from 0.1% to 5%, substantially as described.

4. In a thermo-electric pyrometer comprising a thermo-couple of rare or noble metals and a current indicating or measuring device, leads connected to the thermo-couple and forming a portion at least of the connections between the thermo-couple and said current indicating or measuring device, one of said leads being composed of copper and the other of an alloy consisting of copper from 99.9% to 95%, and nickel from 0.1% to 5%.

In testimony whereof I have signed my name to this specification in the presence of two subscribing witnesses.

WILFRID STEVENSON PEAKE.

Witnesses:
   H. D. JAMESON,
   F. L. RAND.